(12) United States Patent
Nagar et al.

(10) Patent No.: US 11,570,539 B2
(45) Date of Patent: Jan. 31, 2023

(54) SAFEGUARDING AUDIO DEVICE BASED ON DETECTION OF FREEFALL OR LOST SCENARIOS

(71) Applicant: International Business Machines Corporation, Armonk, NY (US)

(72) Inventors: Raghuveer Prasad Nagar, Kota (IN); Sarbajit K. Rakshit, Kolkata (IN); Manjit Singh Sodhi, Bangalore (IN); Manoj Kumar Goyal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 17/207,651

(22) Filed: Mar. 20, 2021

(65) Prior Publication Data
US 2022/0303660 A1 Sep. 22, 2022

(51) Int. Cl.
*H04R 1/10* (2006.01)
*H04R 29/00* (2006.01)
*G01P 15/18* (2013.01)
*H04R 5/02* (2006.01)

(52) U.S. Cl.
CPC ............ *H04R 1/1041* (2013.01); *G01P 15/18* (2013.01); *H04R 1/1091* (2013.01); *H04R 29/001* (2013.01); *H04R 2460/07* (2013.01)

(58) Field of Classification Search
CPC .. H04R 1/1041; H04R 1/1091; H04R 29/001; H04R 2460/07; G01P 15/18
USPC .................................................. 381/74, 305
See application file for complete search history.

(56) References Cited

U.S. PATENT DOCUMENTS

| 7,450,332 | B2  | 11/2008 | Pasolini |
| 7,549,335 | B2  | 6/2009  | Inoue |
| 9,116,668 | B2  | 8/2015  | Xiaozhuo |
| 9,668,076 | B2* | 5/2017  | Bidmead .............. H04R 29/004 |

(Continued)

FOREIGN PATENT DOCUMENTS

| CN | 101060244 A | 10/2007 |
| CN | 105923124 B | 1/2018 |

(Continued)

OTHER PUBLICATIONS

"Apple applies the falling-cat method to keep dropped iPhone intact", The Mercury News, Published: Jun. 2, 2016, 2 pps., <https://www.mercurynews.com/2016/06/02/apple-applies-the-falling-cat-method-to-keep-dropped-iphone-intact/>.

(Continued)

*Primary Examiner* — Ammar T Hamid
(74) *Attorney, Agent, or Firm* — Gavin Giraud

(57) ABSTRACT

Aspects of the present invention disclose a method for safeguarding an audio device by enabling the audio device to perform harm prevention and retrieval related task based on detecting a set of conditions within an operating environment of the audio device. The method includes one or more processors determining a freefall event of an audio device is occurring. The method further includes one or more processors determining an operating environment type of a surface the audio device contacts after the freefall event ends, wherein the operating environment type of the surface indicates liquid is present. The method further includes responsive to the indication that water is present one or more processors taking a liquid mitigation action.

18 Claims, 4 Drawing Sheets

(56) References Cited

U.S. PATENT DOCUMENTS

| | | | |
|---|---|---|---|
| 9,780,621 B2 | 10/2017 | Rothkopf | |
| 10,045,111 B1* | 8/2018 | Bonner | H04R 1/1041 |
| 2006/0150731 A1 | 7/2006 | Fontanella | |
| 2010/0246846 A1* | 9/2010 | Burge | H04R 1/1041 |
| | | | 341/20 |
| 2015/0179037 A1* | 6/2015 | Ren | G01L 7/18 |
| | | | 340/522 |
| 2016/0154439 A1* | 6/2016 | Rothkopf | G06F 1/1694 |
| | | | 340/3.1 |
| 2017/0011613 A1 | 1/2017 | Iio | |
| 2017/0142527 A1 | 5/2017 | Pedersen | |
| 2019/0086969 A1* | 3/2019 | MacNeil | G06F 1/1626 |
| 2019/0096226 A1* | 3/2019 | Buschmann | G08B 21/22 |
| 2019/0179344 A1* | 6/2019 | Qu | B64C 17/02 |
| 2021/0144463 A1* | 5/2021 | Gong | H04R 1/1091 |
| 2021/0204051 A1* | 7/2021 | Hanes | A61B 5/02438 |

FOREIGN PATENT DOCUMENTS

| | | |
|---|---|---|
| CN | 108200293 A | 6/2018 |
| CN | 109462787 A | 3/2019 |
| CN | 110944281 A | 3/2020 |
| CN | 111601203 A | 8/2020 |
| CN | 111770409 A | 10/2020 |
| CN | 111954109 A | 11/2020 |
| EP | 1643501 B1 | 6/2013 |

OTHER PUBLICATIONS

"Apple Invents a Unique System to Protect Various Lenses in Smartglasses from Colliding or Smashing when in Freefall", Patently Apple, Dec. 15, 2019, 8 pps., <https://www.patentlyapple.com/patently-apple/2019/12/apple-invents-a-unique-system-to-protect-various-lenses-in-smartglasses-from-colliding-or-smashing-when-in-freefall.html>.

"Electroactive polymers", From Wikipedia, the free encyclopedia, last edited on Feb. 2, 2021, 4 pps , <https://en.wikipedia.org/wiki/Electroactive_polymers>.

"Free falling iPhone to rotate in mid-air to prevent damage", The Economic Times, Panache, Dec. 3, 2014, 4 pps., <https://economictimes.indiatimes.com/magazines/panache/free-falling-iphone-to-rotate-in-mid-air-to-prevent-damage/articleshow/45360704.cms?utm_source=contentofinterest&utm_medium=text&utm_campaign=cppst>.

"How to Make CO2", wikiHOW, Sep. 6, 2019, 3 pps., <https://www.wikihow.com/Make-CO%E2%82%82>.

Caldwell, "How to repair or replace broken AirPods", iMore, Jan. 11, 2018, 9 pps., <https://www.imore.com/how-repair-or-replace-broken-airpods>.

Dundas, "The 7 Best Smart Water Sensors of 2021 The easiest way to detect leaks before major damage happens", Updated on Sep. 24, 2020, Lifewire, 7 pps., <https://www.lifewire.com/best-smart-water-sensors-4159940>.

Lad, "Free Fall Detection Using 3-Axis Accelerometer", hackster.io, Published Jun. 15, 2019, 6 pps., <https://www.hackster.io/RVLAD/free-fall-detection-using-3-axis-accelerometer-06383e>.

Raasch, "Accelerometers and free-fall detection protects data and drives", embedded, Technical Article, Feb. 28, 2007, 7 pps., <https://www.embedded.com/accelerometers-and-free-fall-detection-protects-data-and-drives/ >.

Ranj, "The Airpods' biggest design 'flaw' is actually their greatest strength—here's why I think Apple got it right", Insider Picks, Jul. 19, 2018, 6 pps., <https://www.businessinsider.com/airpods-design-flaw-is-really-a-strength-2018-7?IR=T>.

* cited by examiner

SAFEGUARDING AUDIO DEVICE BASED ON DETECTION OF FREEFALL OR LOST SCENARIOS

BACKGROUND OF THE INVENTION

The present invention relates generally to the field of communications devices, and more particularly to harm prevention of audio devices.

Headphones have long been used to play audio from electronic devices. More recently, wireless headphones have become more frequently used. Wireless headphones, however, that are known to an electronic device are tethered together. Additionally, wireless headphones that are known to an electronic device can be freely placed into a discovery mode that could be used to communicatively couple the wireless headphones with a new electronic device without erasing existing connection history.

Electroactive polymers (EAPs) are polymers that exhibit a change in size or shape when stimulated by an electric field. The most common applications of this type of material are in actuators and sensors. A typical characteristic property of an EAP is that the EAP will undergo a large amount of deformation while sustaining large forces. An EAP can have several configurations but are generally divided in two principal classes: Dielectric and Ionic.

A personal area network (PAN) is a computer network for interconnecting electronic devices centered on an individual person's workspace. A PAN provides data transmission among devices such as computers, smartphones, tablets and personal digital assistants. PANs can be used for communication among the personal devices themselves, or for connecting to a higher-level network and the Internet where one master device takes up the role as gateway. A PAN may be wireless or carried over wired interfaces. A wireless personal area network (WPAN) is a PAN carried over a low-powered, short-distance wireless network technology that varies from a few centimeters to a few meters.

SUMMARY

Aspects of the present invention disclose a method, computer program product, and system for safeguarding an audio device by enabling the audio device to perform harm prevention and retrieval related task based on detecting a set of conditions within an operating environment of the audio device. The method includes one or more processors determining a freefall event of an audio device is occurring. The method further includes one or more processors determining an operating environment type of a surface the audio device contacts after the freefall event ends, wherein the operating environment type of the surface indicates liquid is present. The method further includes responsive to the indication that water is present one or more processors taking a liquid mitigation action.

DETAILED DESCRIPTION

Embodiments of the present invention allow for an audio device to perform harm prevention and retrieval related task based on detection of a set of conditions within an operating environment of the audio device. Embodiments of the present invention utilizes an extended arm and spring of an audio device to minimize impact of the audio device with a surface. Additional embodiments of the present invention determine whether an audio device is being utilized for an unintended purpose. In further embodiments of the present invention perform retrieval task to prevent a user from losing an audio device that is no longer within the immediate control of the user.

Some embodiments of the present invention recognize that a high probability exist that an audio device will fall and contact various types of surfaces. As a result, there exist a need to protect an audio device and/or mitigate damage to the audio due to falls or other potentially harmful scenarios. Various embodiments of the present invention remedy such challenges by modifying a center of gravity of an audio device so that a point of impact of the audio device is predefined. In addition, embodiments of the present invention perform retrieval task that prevent a user from abandoning an audio device that fell while the user was unaware.

Embodiments of the present invention operate to advance safeguard capabilities of an audio device by enabling the ability to dynamically define an impact point of the audio device during a free fall scenario. The embodiments of the present invention enable the audio device to autonomously return to a user leaving a location where the audio device is lost.

Implementation of embodiments of the invention may take a variety of forms, and exemplary implementation details are discussed subsequently with reference to the Figures.

Figure 1:
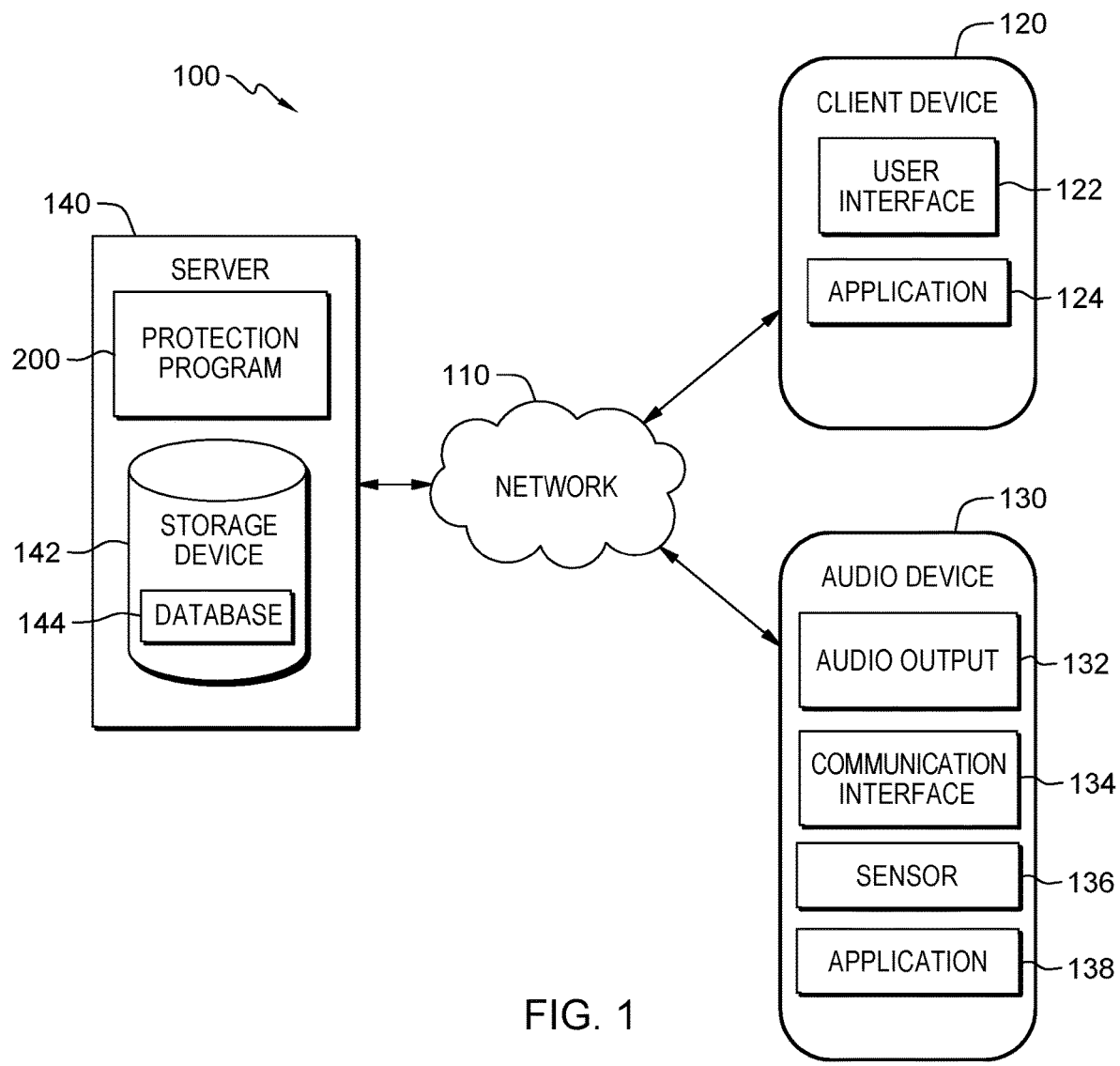
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, application 124, or communication interface 134, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Protection program 200 enables the authorized and secure processing of personal data. Protection program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Protection program 200 provides information regarding personal data and the nature (e.g., type, scope, purpose, duration, etc.) of the processing. Protection program 200 provides the user with copies of stored personal data. Protection program 200 allows the correction or completion of incorrect or incomplete personal data. Protection program 200 allows the immediate deletion of personal data.

Distributed data processing environment 100 includes server 140, audio device 130, and client device 120, all interconnected over network 110. Network 110 can be, for example, a telecommunications network, a local area network (LAN), a personal area network (PAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, audio device 130, and client device 120, and other computing devices (not shown) within distributed data processing environment 100.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 4, in accordance with embodiments of the present invention.

Client device 120 includes user interface 122 and application 124. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of protection program 200.

Audio device 130 can be one or more of a hearing aids, wireless headphones, or any programmable electronic device capable of communicating with various components and devices within distributed data processing environment 100, via network 110. In general, audio device 130 represents one or more programmable electronic devices or combination of programmable electronic devices capable of executing machine readable program instructions and communicating with other computing devices (not shown) within distributed data processing environment 100 via a network, such as network 110. Audio device 130 may include components as depicted and described in further detail with respect to FIG. 4, in accordance with embodiments of the present invention.

Audio device 130 includes a processor, memory, audio output 132, communication interface 134, sensor 136, and application 138. In various embodiments of the present invention, audio device 130 includes audio output 132 for converting a received signal, which can include audio data, into audible sound. The received signal can be received from a paired companion communication device (not shown) or client device 120 via the communication interface 134. Generally, audio device 130 utilizes communication interface 134 to communicatively couple with companion communication device (not shown) and to pair with client device 120 (e.g., a computing device) that can provide audio data that audio device 130 can reproduce as audio signals for a user of audio device 130.

Sensor 136 is a device, module, machine, or subsystem that detects events or changes in an environment of the device and sends the information to other electronics. In one embodiment, sensor 136 represents a variety of sensors of audio device 130 that collects and provides various kinds of data. For example, audio device 130 utilizes one or more sensors (e.g., sensor 136, accelerometer, gyroscope, water detector, etc.) for detecting a wearing status of audio device 130 such as when audio device 130 is placed in and/or removed from an ear the user. In this example, protection program 200 utilizes a client-side application (e.g., application 138) and sensor 136 to determine whether audio device 130 is in an ear of the user (e.g., an in-ear wearing status), or is not in the ear of the user (e.g., an out-of-ear wearing status).

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 4, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and protection program 200. Storage device 142 can be implemented with any type of storage device, for example, persistent storage 405, which is capable of storing data that may be accessed and utilized by client device 120, audio device 130, and server 140, such as a database server, a hard disk drive, or a flash memory. In one embodiment storage device 142 can represent multiple storage devices within server 140. In various embodiments of the present invention, storage device 142 stores numerous types of data which may include database 144. Database 144 may represent one or more organized collections of data stored and accessed from server 140. For example, database 144 includes a wear status of audio device 130, retrieval task, mitigation task, etc. In one embodiment, data processing environment 100 can include additional servers (not shown) that host additional information that accessible via network 110.

Generally, protection program 200 safeguards an audio device by enabling the audio device to perform harm prevention and retrieval related task based on detecting a set of conditions within an operating environment of the audio device. In one embodiment, request program 200 utilizes sensor 136 to detect an event and defines an impact point of audio device 130 based on the event. In this example, request program 200 activates a means (e.g., spring, damper, etc.) for absorbing and/or dissipating an impact of an external force at the impact point of audio device 130. Additionally, request program 200 can activate rotors of audio device 130 to transport audio device 130 to a location of a paired companion communication device (not shown) or client device 120. Furthermore, request program 200 can determine whether a set of conditions of the operating environment of audio device 130 conform with an intended purpose of audio device 130. In addition, request program 200 determines whether audio device 130 contacts water and inflates a balloon that cause audio device 130 to float in the water.

Figure 2:
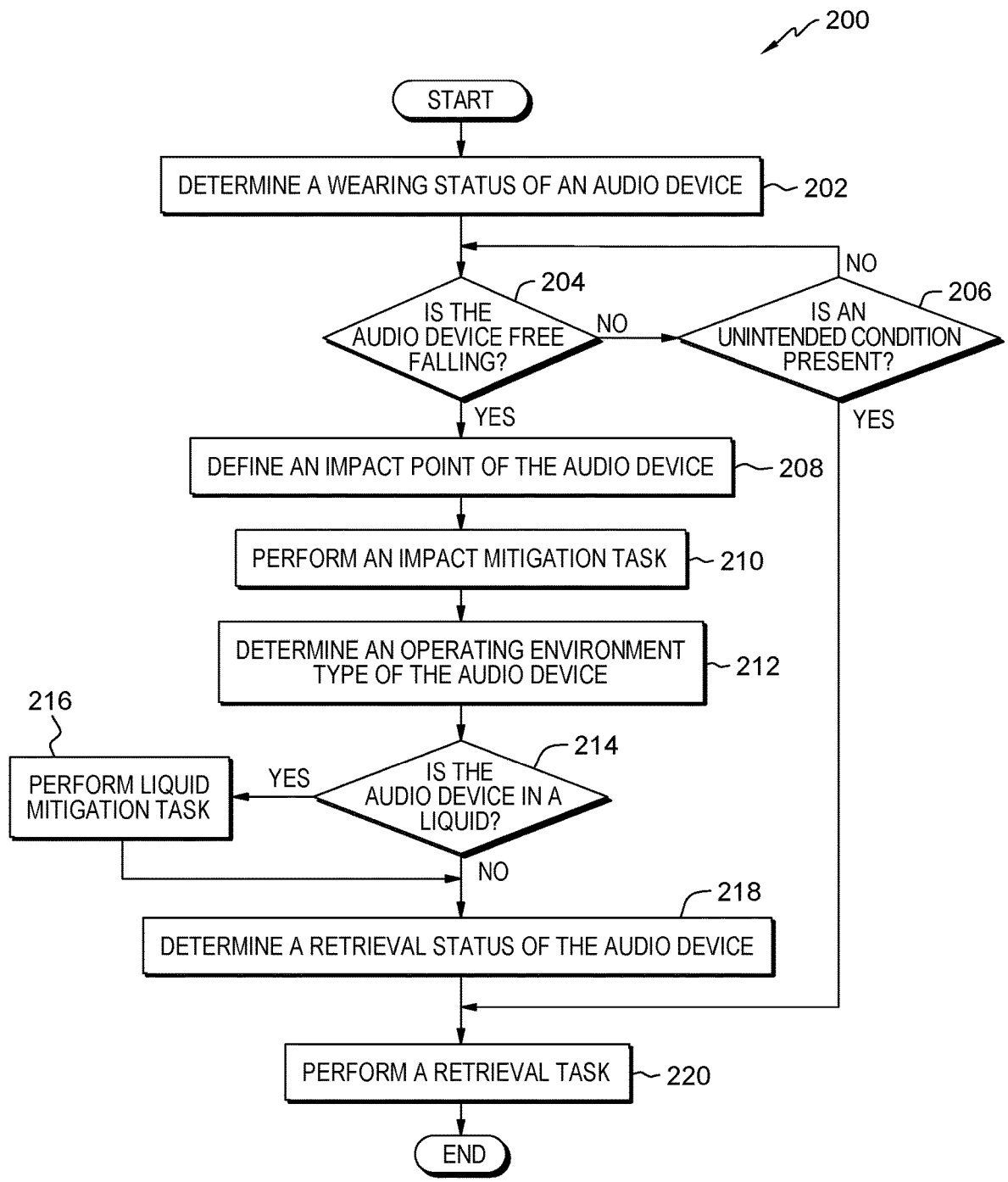
FIG. 2 is a flowchart depicting operational steps of a program, within the data processing environment of FIG. 1, for safeguarding an audio device by enabling the audio device to perform harm prevention and retrieval related task based on detecting a set of conditions within an operating environment of the audio device, in accordance with embodiments of the present invention.

FIG. 2 is a flowchart depicting operational steps of protection program 200, a program that safeguards an audio device by enabling the audio device to perform harm prevention and retrieval related task based on detecting a set of conditions within an operating environment of the audio device, in accordance with embodiments of the present invention. In one embodiment, protection program 200 initiates in response to a user connecting audio device 130 to protection program 200 through network 110. For example, protection program 200 initiates in response to a user pairing wireless earbuds (e.g., audio device 130) with a mobile device (e.g., client device 120) and registering (e.g., opting-in) the devices with protection program 200 via a WLAN (e.g., network 110). In another embodiment, protection program 200 is a background application (e.g., application 138) that continuously monitors audio device 130. For example, protection program 200 is a client-side application (e.g., application 138) that initiates upon pairing wireless earbuds (e.g., audio device 130) with a mobile device (e.g., client device 120) of a user and monitors events of the wireless earbuds.

In step 202, protection program 200 determines a wearing status of an audio device. In one embodiment, protection program 200 utilizes sensor 136 to determine a wearing status of audio device 130. The wearing status of the audio device indicates whether or not at least a portion of the device is touching an ear. For example, request program 200 utilizes one or more sensors, such as accelerometer, gyroscope, biometric, etc. (e.g., sensor 136) to detect a wearing status (e.g., in ear, out of ear, etc.) of a wireless ear bud (e.g., audio device 130). In this example, protection program 200 utilizes a client-side application (e.g., application 138) biometric sensor to determine whether the wireless ear bud is being removed or placed in an ear of a user by fingertips that correspond to the user. In another example, protection program 200 utilizes a biometric sensor (e.g., sensor 136) of a wireless ear bud (e.g., audio device 130) to determine a wearing status based on a temperature of an ear of a user and contact with membrane of the user. Alternatively, the wearing status of the audio device is reported by the user. Reporting the wearing status may be performed by input of an audible command to the client device or by input via a user interface 122. Alternatively, the wearing status is determined to be "touching the ear" whenever audio is generated by audio output 132.

Figure 3:
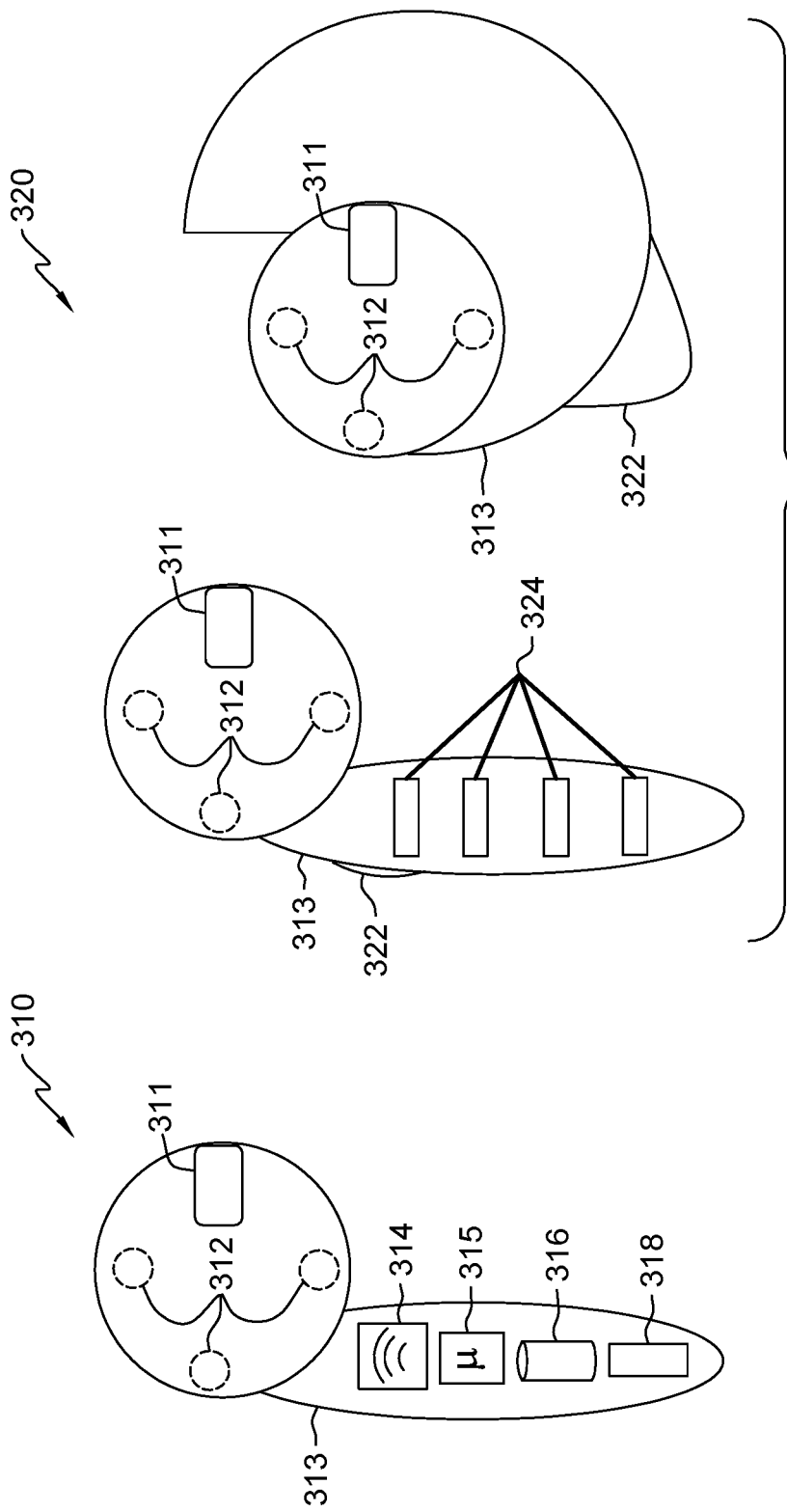
FIG. 3A is a diagram depicting an illustration of an audio device, in accordance with embodiments of the present invention.
FIG. 3B is a diagram depicting an illustration of an audio device prior to and following detecting a freefall event, in accordance with embodiments of the present invention.

FIG. 3A depicts earbud 310, which is an example illustration of an instance of an audio device that protection program 200 safeguards, in accordance with example embodiments of the present invention. Earbud 310 includes output device 311, sensor(s) 312, extended arm 313, communication module 314, microprocessor 315, memory 316, and battery 318. Output device 311 is a device that converts a received signal, which can include audio data, into audible sound. Sensor(s) 312 is a device, module, machine, or subsystem that detects events or changes in an environment of the device and sends the information to other electronics. Extended arm 313 is a segment of earbud 310 that makes up a housing of earbud 310. Communication module 314 allows earbud 310 to communicatively couple with a companion communication device (not shown) (e.g., second earbud), to pair with client device 120, and to communicate with server 140. Microprocessor 315 is a central processing unit on a single integrated circuit chip. Memory 316 is a device that stores information for immediate use in earbud 310. Battery 318 is a device consisting of one or more electrochemical cells with external connections for powering earbud 310. In an example embodiment with respect to FIG. 3A, protection program 200 utilizes sensor(s) 312 to determine a wearing status of earbud 310.

In decision step 204, protection program 200 determines whether the audio device is free falling. In one embodiment, protection program 200 utilizes sensor 136 to determine whether an instance of a freefall event of audio device 130 is occurring. For example, protection program 200 utilizes an accelerometer (e.g., sensor 136) and microprocessor of a wireless earbud (e.g., audio device 130) to determine whether the wireless ear bud is experiencing a freefall event. In this example, protection program 200 utilizes measurements of the microprocessor corresponding to the acceleration in the X, Y, and Z axes of the wireless earbud to compare to a defined threshold (e.g., approximately (0) zero g-force). As a result, protection program 200 determines whether the wireless earbud is at rest (e.g., approximately (1) one g-force "down") or in a freefall event (e.g., exceeding the defined threshold). In an alternative embodiment, protection program 200 determines whether a freefall event is occurring after determining that a wireless earbud has an "in ear" (e.g., positive) wearing status.

In another embodiment, if protection program 200 determines that an instance of a freefall event of audio device 130 is not occurring (decision step 204, "NO" branch), then protection program 200 determines whether a condition of an operating environment of audio device 130 complies with technical ratings of audio device 130 as discussed below in step 206. For example, if protection program 200 determines that measurements (e.g., measurements are (0.9) or approximately one (1)) corresponding to the acceleration in the X, Y, and Z axes of a wireless earbud (e.g., audio device 130) do not exceed (i.e., numerical value of measurement is not less than threshold) a defined threshold (e.g., (0.2) or approximately zero (0)), then protection program 200 determines that a freefall event is not occurring and continues to monitor the wireless earbud of a user.

In another embodiment, if protection program 200 determines that an instance of a freefall event of audio device 130 is occurring (decision step 204, "YES" branch), then protection program 200 determines an impact point of audio device 130 as discussed below in step 208. For example, if protection program 200 determines that measurements (e.g., measurements are (0.1) or approximately zero (0)) corresponding to the acceleration in the X, Y, and Z axes of a wireless earbud (e.g., audio device 130) exceeds (i.e., numerical value of measurement is less than threshold) a defined threshold (e.g., (0.2) or approximately zero (0)), then protection program 200 determines that a freefall event is occurring and defines an impact point of the wireless earbud of a user.

In decision step 206, protection program 200 determines whether an unintended condition is present. In one embodiment, protection program 200 utilizes sensor 136 to determine whether a condition of an operating environment of audio device 130 complies with technical ratings of audio device 130. For example, protection program 200 stores recommended operating conditions (e.g., temperatures, tensile strength, etc.) of technical documentation of a wireless earbud (e.g., audio device 130) in memory of the wireless earbud or a database (e.g., database 144) and determines whether a condition in an operating environment of the wireless earbud is suitable using the recommended operating conditions. In this example, protection program 200 utilizes one or more sensors (e.g., sensor 136) such as temperature, pressure etc. to determine whether the condition in the operating environment of the wireless earbud exceeds a defined threshold (e.g., recommended operating conditions).

In another embodiment, if protection program 200 determines that a condition of an operating environment of audio device 130 complies with technical ratings of audio device 130 (decision step 206, "NO" branch), then protection program 200 continues to monitor audience device 130 for an unintended condition. For example, if protection program 200 determines a temperature sensor (e.g., sensor 136) of a wireless earbud (e.g., audio device 130) records a temperature (e.g., 120° F.) in an operating environment of the wireless earbud and determines that the temperature does not exceeds a recommended operating condition (e.g., 130° F., defined threshold, etc.), then protection program 200 determines that an unintended condition is not present and continues to monitor the operating environment of the wireless earbud of a user.

In another embodiment, if protection program 200 determines that a condition of an operating environment of audio device 130 does not comply with technical ratings of audio device 130 (decision step 206, "YES" branch), then protection program 200 initiates audio device 130 to perform a retrieval task. For example, if protection program 200 determines a temperature sensor (e.g., sensor 136) of a wireless earbud (e.g., audio device 130) records a temperature (e.g., 135° F.) in an operating environment of the wireless earbud and determines that the temperature exceeds a recommended operating condition (e.g., 130° F., defined threshold, etc.), then protection program 200 triggers the wireless earbud to notify a user of a harsh condition (e.g., excessive use condition) that may damage the wireless earbud. According to some embodiments of the present invention, notification is provided by an audible alert sent through the earbud speaker. Alternatively, notification is provided to a designated contact via e-mail or text message. According to some embodiments of the present invention, when notification is provided to a designated contact, a GPS location is also communicated to simplify locating the distressed earbud.

In step 208, protection program 200 defines an impact point of the audio device. In one embodiment, protection program 200 determines an impact point of audio device 130. For example, protection program 200 shifts a center of gravity of a wireless earbud (e.g., audio device 130) to turn the wireless earbud to a position so that a predefined impact segment (e.g., impact point) of the housing of the wireless earbud makes contact with a surface prior to any other portion of the wireless earbud making contact with the surface. Alternatively, an impact point of the audio device is pre-defined according to the physical structure of the audio device.

FIG. 3B depicts protect mode 320, which is an example illustration of an instance of earbud 310 of FIG. 3A prior to and following protection program 200 detecting a freefall event, in accordance with example embodiments of the present invention. Protect mode 320 depicts earbud 310, which includes output device 311, sensor(s) 312, extended arm 313, mitigation device 322, and electroactive polymers (EAPs) 324. Mitigation device 322 is a device designed to absorb and damp shock impulses by converting the kinetic energy of the shock into another form of energy. EAP 324 are materials that demonstrate large strain in response to electrical fields and these actuators closely emulate the stimulus response capacities of animal muscle and are often referred to as artificial muscles. For example, EAP 324 can be constructed as an array of electroactive polymers positioned in different segments of extended arm 313 of earbud 310. In this example, extended arm 313 of earbud 310 is made of a flexible material that can be rolled or folded. In addition, based on the properties of the material of EAP 324, upon applying electric field EAP 324 will start bending extended arm 313 to retract and/or roll extended arm 313. In an example embodiment, request program 200 determines that earbud 310 is experiencing a freefall event and applies an electric field to different portions of an array of EAP 324. As a result, request program 200 modifies the length and rolling pattern of extended arm 313 of earbud 310 that changes the center of gravity (CG) of the rolled earbud 310 displayed in FIG. 3B. In this example, request program 200 retracts/rolls extended arm 313 (e.g., millipede shape of FIG. 3B) that shifts (e.g., changes, modifies, etc.) the CG of earbud 310 to a predefined position so that the segment corresponding to mitigation device 322 is a designated impact point of earbud 310 with a surface below.

In step 210, protection program 200 performs an impact mitigation task. In one embodiment, protection program 200 triggers an impact mitigation device of audio device 130. For example, a wireless earbud (e.g., audio device 130) includes a compressed spring (e.g., mitigation device) at the predefined impact position of the wireless earbud. In this example, request program 200 dynamically activates the impact mitigation device (e.g., exposing a damper, compressed spring, etc.) of the predefined impact position of the wireless earbud. As a result, the compressed spring expands, absorbing the impact and preventing damage to the wireless earbud from contact with a surface due to the freefall event. Referring now to FIG. 3B, in the example embodiment, request program 200 activates mitigation device 322 of earbud 310. As a result, the depicted rolled instance of earbud 310 now displays mitigation device 322 expanded.

In another example, request program 200 utilizes a gyroscope (e.g., sensor 136) to determine an orientation of a wireless earbud (e.g., audio device 130) during a free fall event. In this example, request program 200 determines that a predefined impact position of the wireless earbud is in a proper position due to a modified CG and triggers the expansion one or more collapsed propellers of the wireless earbud. Additionally, request program 200 can instruct the propellers of the wireless device to rotate, resulting in a reduced impact force of the wireless earbud with a surface.

In step 212, protection program 200 determines an operating environment type of the audio device. In one embodiment, protection program 200 determines an operating environment type of a surface audio device 130 contacts. For example, protection program 200 utilizes a water sensor (e.g., sensor 136) to determine a type of a surface a wireless earbud (e.g., audio device 130) is resting on and/or in after making impact. In this example, request program 200 utilizes measurements of the water sensor to determine whether an operating environment of the wireless earbud includes water. Additionally, request program 200 assigns a classification (e.g., wet, dry, etc.) to the operating environment based on the water sensor indicating the presence of water in the operating environment of the wireless earbud.

In decision step 214, protection program 200 determines whether the audio device is in liquid. In one embodiment, protection program 200 utilizes sensor 136 to determine whether audio device 130 is submerged in a liquid. For example, protection program 200 can utilize a classification of an operating environment of a wireless earbud (e.g., audio device 130) and water sensors (e.g., sensor 136) to determine whether the wireless earbud is submerged in water (e.g., liquid). In this example, request program 200 identifies a classification of an operating environment and determines whether to monitor additional water sensors of the wireless earbud for water measurements at various segments of the wireless earbud. Additionally, protection program 200 can utilizes "wear status" of the wireless earbud to determine whether the wireless earbud is submerged in water.

In another embodiment, if protection program 200 determines that audio device 130 is not submerged in a liquid (decision step 206, "NO" branch), then protection program 200 determines a retrieval status of audio device 130. For example, if protection program 200 determines a classification of an operating environment of a wireless earbud (e.g., audio device 130) is "Dry", then protection program 200 determines a retrieval status of the wireless earbud of a user as discussed below in step 218.

In another embodiment, if protection program 200 determines that audio device 130 is submerged in a liquid (decision step 206, "YES" branch), then protection program 200 triggers a liquid mitigation device of audio device 130. For example, if protection program 200 determines a classification of an operating environment of a wireless earbud (e.g., audio device 130) is "Wet" and one or more water sensors (e.g., sensor 136) have water measurements that indicate the wireless earbud is in contact with water in multiple areas, including but not limited to inside the wireless earbud, then protection program 200 activates a task that causes the wireless earbud to float in the water the wireless earbud is submerged in.

In step 216, protection program 200 performs liquid mitigation task. In one embodiment, protection program 200 triggers a liquid mitigation device of audio device 130. For example, a wireless earbud (e.g., audio device 130) includes one or more chambers that include chemicals that react with water to generate a gas (e.g., $CO_2$), which inflates deflated balloons connected to the one or more chambers (i.e., the chemical is exposed to water gradually and only an essential amount of chemical can be used). In this example, protection program 200 controls a valve connected to the one or more chambers to control the amount of water allowed in a chamber to react with a chemical mixture (e.g., sugar, yeast, sodium bicarbonate, yeast extracts, etc.) stored within. As a result, the wireless earbud will begin to float in the water due to the inflated balloons.

In one scenario, if protection program 200 determines that a wireless earbud (e.g., audio device 130) is out of an ear of a user (e.g., out of ear status) and also has a "wet" classification for an operating environment, then protection program 200 opens a valve and allows water to react with stored chemicals of a chamber. As a result, one or more attached balloons are inflated by the reaction, and if protection program 200 determines the wireless earbud is floating on the water based on measurements of a gyroscope and accelerometer (e.g., sensor 136), then protection program 200 closes valves to the one or more chambers to preserve the chemicals.

In step 218, protection program 200 determines a retrieval status of the audio device. In one embodiment, protection program 200 determines a retrieval status of audio device 130. For example, protection program 200 determines a distance between a paired device (e.g., client device 120, companion device, etc.) of a wireless earbud (e.g., audio device 130) and the wireless device exceeds a defined threshold. In this example, protection program 200 utilizes a global positioning system (GPS) signal of the wireless earbud and the paired device to determine a separation distance based on respective GPS signals. In one scenario, if protection program 200 determines that the separation distance of the wireless earbud does not exceed the defined threshold, then protection program 200 performs a first set of retrieval tasks. In the alternative, if protection program 200 determines the wireless earbud exceeds the defined threshold, then protection program 200 performs a second set of retrieval tasks.

In step 220, protection program 200 performs a retrieval task. In one embodiment, protection program 200 initiates audio device 130 to perform a retrieval task. For example, protection program 200 instructs a wireless earbud (e.g., audio device 130) to perform one or more retrieval task. In this example, protection program 200 can instruct the wireless earbud to play an audible sound to notify a user or transmit the audible sound to a paired device (e.g., client device 120, companion device, etc.). Also, protection program 200 can generate notification that is transmitted to a mobile device (e.g., client device 120) of a user. Additionally, protection program 200 can utilize a client-side application (e.g., application 138) to communicate with the paired device or the companion device to direct the flight path of the wireless earbuds via collapsible propellers to a location of the paired device or companion device (i.e., follow a mobile device of the user).

In one scenario, if protection program 200 determines that a wireless earbud (e.g., audio device 130) is floating in water and/or is beyond a separation distance (e.g., defined threshold of step 218), then protection program 200 transmits a notification to a mobile device (e.g., client device 120) of a user. In another scenario, if protection program 200 determines that a user is not utilizing a wireless earbud (e.g., audio device 130) in unsuitable environment as discussed in step 206 "YES" branch, then protection program 200 instructs the wireless earbud to transmits a notification to a mobile device (e.g., client device 120) of a user or plays an audible alert.

Figure 4:
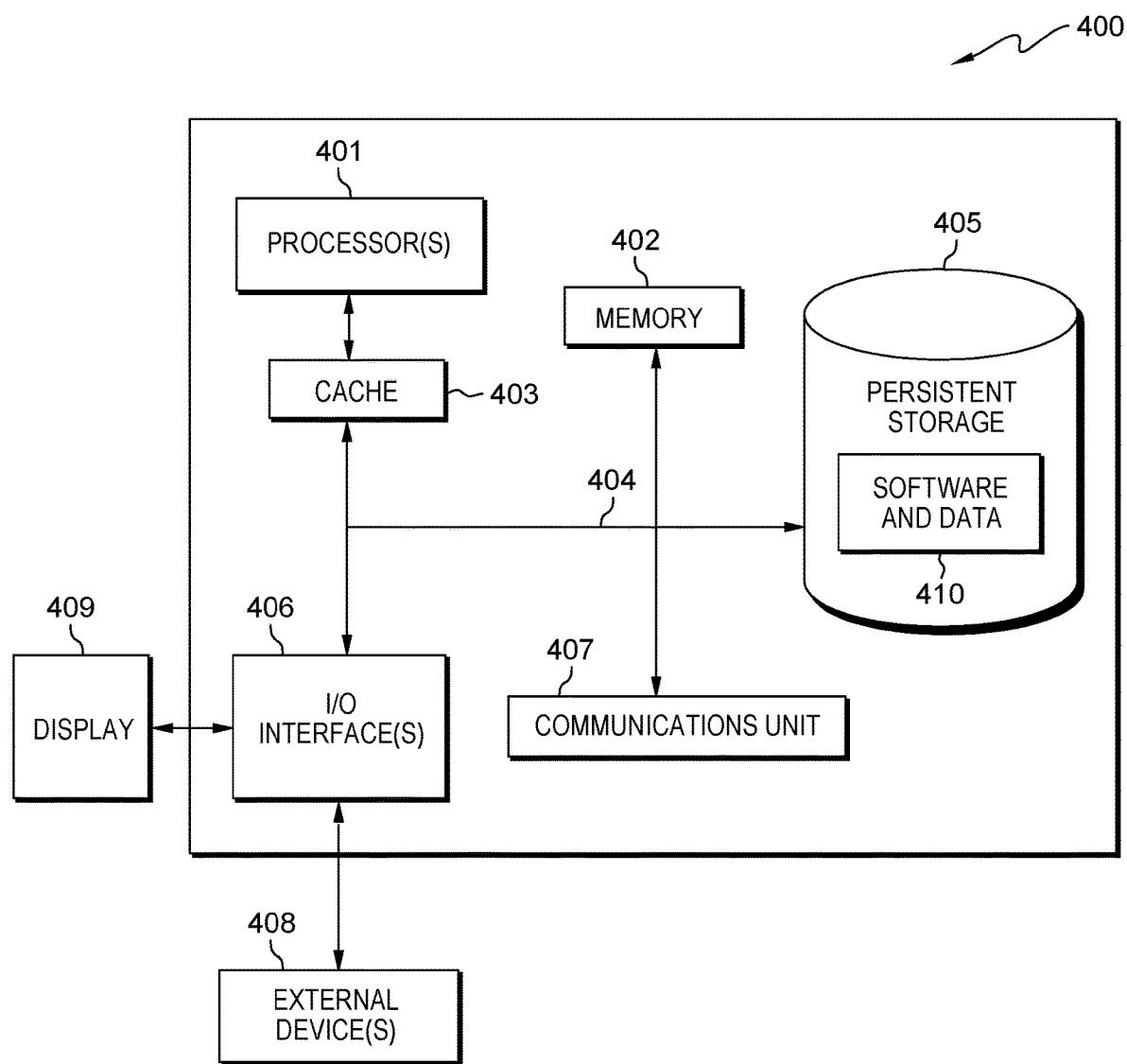
FIG. 4 is a block diagram of components of FIG. 1, in accordance with an embodiment of the present invention.

FIG. 4 depicts a block diagram of components of client device 120, audio device 130, and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of user interface 122 and application 124. With respect to audio device 130, software and data 410 includes data of communication interface 134, sensor 136 and application 138. With respect to server 140, software and data 410 includes data of storage device 142 and protection program 200.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving a signal through a network from one or more sensors within an audio device;
   determining a freefall event of the audio device is occurring based on the signal;
   determining an operating environment type of a surface the audio device contacts after the freefall event ends based on the signal, wherein the operating environment type of the surface indicates liquid is present; and
responsive to the indication that water is present, taking a liquid mitigation action comprising inflating a balloon of the audio device.

2. The computer-implemented method of claim 1, further comprising:
determining a wearing status of the audio device; and
responsive to the wearing status being touching an ear of a user, monitoring the audio device for the freefall event.

3. The computer-implemented method of claim 2, further comprising:
monitoring a user location as a location of client device;
monitoring a device location as a location of the audio device;
determining a threshold distance exists between the device location and the user location; and
notifying the user of the threshold distance.

4. The computer-implemented method of claim 1, wherein determining the freefall event of the audio device is occurring, further comprises:
in response to determining a change in the wearing status of the audio device from touching an ear to out of ear, determining an acceleration rate of the audio device, wherein the one or more sensors comprise an accelerometer; and
determining the acceleration rate of the audio device exceeds a pre-defined threshold acceleration indicating the audio device is no longer at rest.

5. The computer-implemented method of claim 1, further comprising:
identifying an impact point on the audio device during the freefall event; and
triggering an impact mitigation device of the audio device, wherein the impact mitigation device corresponds with the identified impact point on the audio device.

6. The computer-implemented method of claim 5, wherein identifying the impact point of the audio device, further comprises:
in response to identifying the freefall event of the audio device, triggering an extended arm of the audio device to retract; and
modifying a center of gravity of the audio device.

7. A computer-implemented method comprising:
receiving a signal through a network from one or more sensors within an audio device;
determining a wearing status of the audio device to be touching an ear of a user based on the signal;
monitoring the signal for an excessive use condition; and
responsive to detecting the excessive use condition, activating a responsive action device within the audio device based on the detected excessive use condition, wherein the excessive use condition comprises a freefall event and the responsive action comprises:
determining a first location of a client device and a second location of the audio device;
responsive to the first location and the second location exceeding a threshold distance, activating a rotor of the audio device to transport the audio device to a location of the client device.

8. The computer-implemented method of claim 7, wherein the excessive use condition comprises an operating temperature above a threshold temperature.

9. The computer-implemented method of claim 8, wherein the pre-defined responsive action for exceeding the threshold temperature comprises activating a communication device to notify the user of the operating temperature.

10. A computer program product comprising:
one or more computer readable storage media and program instructions stored on the one or more computer readable storage media, the program instructions comprising:
program instructions to receive a signal through a network from one or more sensors within an audio device;
program instructions to determine a freefall event of the audio device is occurring based on the signal;
program instructions to determine an operating environment type of a surface the audio device contacts after the freefall event ends, wherein the operating environment type of the surface indicates liquid is present; and
responsive to the indication that water is present, program instructions to take a liquid mitigation action comprising inflating a balloon of the audio device.

11. The computer program product of claim 10, further comprising program instructions, stored on the one or more computer readable storage media, to:
identify an impact point on the audio device during the freefall event; and
trigger an impact mitigation device of the audio device, wherein the impact mitigation device corresponds with the identified impact point on the audio device.

12. The computer program product of claim 11, wherein identifying the impact point of the audio device, further comprise program instructions to:
in response to identifying the freefall event of the audio device, trigger an extended arm of the audio device to retract; and
modify a center of gravity of the audio device.

13. A computer program product comprising:
one or more computer readable storage media and program instructions stored on the one or more computer readable storage media, the program instructions comprising:
program instructions to receive a signal through a network from one or more sensors within an audio device;
program instructions to determine a wearing status of the audio device to be touching an ear of a user based on the signal;
program instructions to monitor the signal for an excessive use condition; and
responsive to detecting the excessive use condition, program instructions to activate a responsive action device within the audio device based on the detected excessive use condition, wherein the excessive use condition comprises a freefall event and the responsive action comprises:
determining a first location of a client device and a second location of the audio device;
responsive to the first location and the second location exceeding a threshold distance, activating a rotor of the audio device to transport the audio device to a location of the client device.

14. A computer system:
one or more computer processors;
one or more computer readable storage media; and
program instructions stored on the computer readable storage media for execution by at least one of the one or more processors, the program instructions comprising:

program instructions to receive a signal through a network from one or more sensors within an audio device;

program instructions to determine a freefall event of the audio device is occurring based on the signal;

program instructions to determine an operating environment type of a surface the audio device contacts after the freefall event ends, wherein the operating environment type of the surface indicates liquid is present; and responsive to the indication that water is present, program instructions to take a liquid mitigation action comprising inflating a balloon of the audio device.

15. The computer system of claim 14, further comprising program instructions, stored on the one or more computer readable storage media for execution by at least one of the one or more processors, to:

determine a wearing status of the audio device; and responsive to the wearing status being touching an ear of a user, monitor the audio device for the freefall event.

16. The computer system of claim 14, further comprising program instructions, stored on the one or more computer readable storage media for execution by at least one of the one or more processors, to:

identify an impact point on the audio device during the freefall event; and trigger an impact mitigation device of the audio device, wherein the impact mitigation device corresponds with the identified impact point on the audio device.

17. The computer system of claim 16, wherein identifying the impact point of the audio device, further comprise program instructions to:

in response to identifying the freefall event of the audio device, trigger an extended arm of the audio device to retract; and modify a center of gravity of the audio device.

18. A computer system:

one or more computer processors;

one or more computer readable storage media; and program instructions stored on the computer readable storage media for execution by at least one of the one or more processors, the program instructions comprising:

program instructions to receive a signal through a network from one or more sensors within an audio device;

program instructions to determine a wearing status of the audio device to be touching an ear of a user based on the signal;

program instructions to monitor the signal for an excessive use condition; and responsive to detecting the excessive use condition, program instructions to activate a responsive action device within the audio device based on the detected excessive use condition, wherein the excessive use condition comprises a freefall event and the responsive action comprises:

determining a first location of a client device and a second location of the audio device;

responsive to the first location and the second location exceeding a threshold distance, activating a rotor of the audio device to transport the audio device to a location of the client device.

* * * * *